(12) United States Patent
Geraci

(10) Patent No.: US 9,726,845 B2
(45) Date of Patent: Aug. 8, 2017

(54) ANTI-REFLECTIVE DEVICE WITH ATTACHMENT MEANS FOR OPTICAL PRODUCTS

(75) Inventor: Maximilian Geraci, Aurora, CO (US)

(73) Assignee: Carson Optical, Inc, Ronkonkoma, NY (US)

( * ) Notice: Subject to any disclaimer, the term of this patent is extended or adjusted under 35 U.S.C. 154(b) by 776 days.

(21) Appl. No.: 13/613,788

(22) Filed: Sep. 13, 2012

(65) Prior Publication Data

US 2014/0071535 A1 Mar. 13, 2014

(51) Int. Cl.
*G02B 27/00* (2006.01)
*G02B 7/00* (2006.01)
*G02B 23/18* (2006.01)
*G02B 23/16* (2006.01)

(52) U.S. Cl.
CPC ............... *G02B 7/00* (2013.01); *G02B 23/18* (2013.01); *G02B 23/16* (2013.01)

(58) Field of Classification Search
None
See application file for complete search history.

(56) References Cited

U.S. PATENT DOCUMENTS

| | | | | |
|---|---|---|---|---|
| 2,785,291 | A | * | 3/1957 | Bernstein ...................... 362/255 |
| 4,684,231 | A | * | 8/1987 | Athy .............................. 396/544 |
| 5,938,317 | A | * | 8/1999 | Thornton ....................... 362/290 |
| 8,075,144 | B2 | * | 12/2011 | Shaw et al. .................... 359/601 |
| 8,142,034 | B1 | * | 3/2012 | Jones ............................. 359/614 |
| 2003/0193811 | A1 | * | 10/2003 | Mullen .......................... 362/455 |

* cited by examiner

*Primary Examiner* — Arnel C Lavarias

(57) ABSTRACT

An anti-reflective device that is to be attached to a variety of types or sizes of optical products via side members. The anti-reflective device is to be used on optical products such as binoculars, monocular, rifle scopes, and spotting scopes, to prevent the return to an object of visible reflections of light emitted from the surface of the objective lens of an optical product. In a simple one-handed motion, the anti-reflective device is to be clamped to the external body of an optical product, used as an anti-reflective device, and removed via a simple one-handed motion.

16 Claims, 12 Drawing Sheets

ANTI-REFLECTIVE DEVICE WITH ATTACHMENT MEANS FOR OPTICAL PRODUCTS

References Cited
U.S. PATENT DOCUMENTS

| | | | |
|---|---|---|---|
| 4,929,055 | May 1990 | Jones | ##/## |
| 5,745,292 | April 1998 | Jones | ##/## |
| 4,342,821 | August 1982 | Galves | ##/## |
| 4,506,953 | March 1985 | Shimizu, et al. | ##/## |
| 4,772,096 | September 1988 | Kai, et al. | ##/## |
| 4,772,097 | September 1988 | Takeuchi, et al. | ##/## |
| 6,580,877 | June 2003 | Phillipp | ##/## |
| 7,686,462 | March 2010 | Jones | ##/## |
| 2,667,678 | April 1950 | Hargrave et al. | ##/## |
| 5,528,328 | June 1996 | O'Farrill | ##/## |
| 5,936,766 | August 1999 | Speicher | ##/## |
| 7,198,417 | April 2007 | Zhang | ##/## |
| 5,327,188 | June 1994 | Kohmoto | ##/## |
| 4,684,231 | August 1987 | Athy | ##/## |
| 6,102,556 | August 2000 | Lieberman et al. | ##/## |
| 6,234,638 | May 2001 | Beverly | ##/## |
| 7,014,344 | March 2006 | Goraguer | ##/## |

FIELD OF THE INVENTION

The present invention relates to anti-reflective devices and the attachment of such devices to the optical products with which they are used. The optical products for which the anti-reflective device is intended to be used with are binoculars, monocular, rifle scopes and spotting scopes. Anti-reflective devices are utilized on optical products to prevent reflections back along the optical axis of such products, allowing the user to prevent detection from animals or other people in their immediate surroundings.

Many anti-reflective devices attachments are used to augment rifle scopes or binoculars, preventing deer from seeing the reflections of a rifle scope, or preventing bird watchers from scaring away any potential bird sightings. Such devices have been used in the past for these purposes, but can be used in any instance during which it is desired to remain inconspicuous to one's immediate surroundings. These devices have thus become important to the success of hunters, birdwatchers and many other optical product consumers wishing to remain camouflaged from their surroundings.

BACKGROUND OF THE INVENTION

Currently on the market, there are multiple anti-reflective devices for rifle scopes. These devices are made to be threaded into the scope and as a result, the size and fit of such devices are severely limited. The threading of these devices requires careful placement of the anti-reflective device on the optical product, requiring the user to correctly place the screw threads so as to promote the correct application of the anti-reflective device. The prior art for all of the anti-reflective devices also fails to provide an anti-reflective device that can both fit different size products and products of different suppliers. The size of the objective lens of the optical product is not the only limiting factor to the use of current anti-reflective devices, the differing pitch of screw threads may impede the fit of this anti-reflective device in any particular product. If the size of a certain lens for an optical good is larger or smaller than that prescribed by the manufacturer, there is no way in which to attach the current anti-reflective devices on the market to products of said manufacturers. The present invention looks to solve this problem by allowing a rotatable connection of the assembly, the device can be used to attach and detach from various size optical devices, and do so without using mating parts on the body of the optical product. The idea behind avoiding mating pieces on the body of the optical product is to allow for the attachment of the anti-reflective device to pre-existing products. This invention can be used without having to match screw threads and also allows adjustment to the size of the objective lens of the optical product.

Another problem with prior art is that the anti-reflective devices on the market do not allow for ease of placement and removal. The user of a current anti-reflective device must (1) place the anti-reflective device exactly perpendicular to the objective lens (2) find the correct location of the beginning of the screw threads (3) screw the anti-reflective device through the fine pitch of the screw threads (4) fully seat the device against the final body of the optical product.

The current invention seeks to improve upon the method of use of anti-reflective devices seen in prior art and also seeks to improve upon the attachment means and design of the device.

SUMMARY OF THE INVENTION

In order to achieve the desired attachment of an anti-reflective device to an optical product, a new anti-reflective device must be implemented. This invention will allow for a single-handed grip of the anti-reflective device with a secure fitting design allowing for universality among brands for one or more sizes of objective lenses. Also provided herein are methods for use of the anti-reflective device on various optical products.

The invention accordingly comprises the features of construction, combination of elements, and arrangement of parts which will be exemplified in the construction, illustration, and description to be set forth, the scope of this device will be indicated in the claims.

This invention allows for ease of use by providing the ability for one-handed quick release of the invention via a spring loaded mechanism. The anti-reflective device related below can be used by simply (1) squeezing the side attachments of the anti-reflective device (2) placing the device on an optical product and (3) releasing the side attachments. The present invention allows the user to quickly place and remove the item, preventing loss of time to previous attachment designs. This design also promotes correct seating of the anti-reflective device against the body of the optical product by creating a plane along the body of the optical product which ensures a correct fit of the anti-reflective device.

The present invention allows for universal brand fit of specific lens diameters (or lens diameter ranges) for optical products. This universal fit has not been demonstrated in prior art and would prove beneficial in the field of anti-reflective devices.

Another advantage to this invention is the ease of application; the device can easily be placed and removed from the desired optical product with one hand, much faster than previous devices could be screwed into place. This function reduces the time spent applying and removing the anti-reflective devices demonstrated in prior art.

The current marketed anti-reflective devices are used primarily for hunting and are applied to rifle scopes. With this invention, the field of use of these devices may be broadened and universalized. An objective of the present invention is to improve upon prior art by extending the use of the device to, binoculars, spotting scopes and monocular.

Another objective of the present invention is to implement an easy application method by providing the ability for a one-handed fit for the anti-reflective device. In this manner, the user is able to secure the device to the desired optical product while holding the optical product in one hand and the anti-reflective device in another.

A fifth objective of the device is to utilize attachment members which allow a tight grip around the body of an optical device. This means that the attachment members may be shaped to form to the body of an optical device or that an extra material such as an elastomer or similar material to that of the body of the optical product is used to create high friction forces between the anti-reflective device and the body of an optical product.

An improvement of the current invention upon other anti-reflective devices is to increase the field of view while maintaining anti-reflective properties. In current applications, all anti-reflective protrusions extend to the same plane. The current invention seeks to decrease the size of the protrusions as they approach the cylindrical perimeter of the device. As the distance from the optical axis of an optical product increases, the height of protrusions that can be used without limiting the field of view also decreases. For this reason, and to prevent impedance of the field of view, the main cylindrical body extends to a point which will block incident light coming from oblique angles into the lens, but the anti-reflective protrusions will be small enough at the border of the device to maintain no impedance of the field of view of the optical product.

All current anti-reflective attachments to optical products are made in metal and are threaded to fit onto the optical product. By making this device in plastic, an advantage is the decrease in cost for the consumer. The anti-reflective device related in this invention allows for cheaper manufacturing and therefore a cheaper product for the consumer that is still very effective A final objective of the present invention is to prevent the user from potentially damaging the objective lens by misuse. The anti-reflective device is made to seat itself around and on the external housing of an objective lens and thus prevent the user from placing the device inside of the objective lens housing where the lens may get damaged by the anti-reflective device.

Thus, an anti-reflective device that is universally adjustable to specific (or multiple) diameters of objective lenses, promotes a quick release from optical products, allows for predetermined seating of the device against the housing of an optical product, promotes a tight grip of the device to the optical product, prevents misuse or harmful contact between the device and the optical product and suppresses the reflection of incident rays on the objective lens of an optical product proves to have desirable advantages over the very specific, non-universal anti-reflective attachments seen in prior art.

In a preferred embodiment, the anti-reflective device comprises: an anti-reflective device for optical products wherein the device includes an anti-reflective portion and an attachment means, the anti-reflective device comprising: a cylindrical main body, which includes an anti-reflective member located in the internal section of main body and comprised of thin-walled structures extending in a direction parallel to the optical axis of the optical product, and one or more side members that function as the attachment means for the device to the objective lens end of the optical product wherein each of the side members: is rotatably connected to the external section of the main body, and provides a clamping force via one or more spring mechanism(s) to the external body of the optical product. The rotatable attachments in this embodiment will use torsion springs to allow for the rotation of the two attachment pieces as well as the secure grip of the anti-reflective device to the optical product in use. Either attachment will rotate about a hinge when squeezed by the user and will clamp to the external body of the optical product when released. A user may then remove the anti-reflective device by again squeezing the hinged attachments and removing the device.

In another preferred embodiment, the anti-reflective device comprises: an anti-reflective device for optical products wherein the device includes an anti-reflective portion and an attachment means, the anti-reflective device comprising: a cylindrical main body, which includes an anti-reflective member located in the internal section of main body and comprised of thin-walled structures extending in a direction parallel to the optical axis of the optical product, and one or more side members that function as the attachment means for the device to the objective lens end of the optical product wherein each of the side members: is rotatably connected to the external section of the main body, and provides a clamping force via one or more spring mechanism(s) to the external body of the optical product. In this assembly, the attachment arms would utilize tension; extending the springs when the rotatable attachments were rotated and using the restoring force of the springs to achieve a secure grip to the optical product in use.

In another embodiment, the anti-reflective device comprises: an anti-reflective device for optical products wherein the device includes an anti-reflective portion and an attachment means, the anti-reflective device comprising: a cylindrical main body, which includes an anti-reflective member located in the internal section of main body and comprised of thin-walled structures extending in a direction parallel to the optical axis of the optical product, and one or more side members that function as the attachment means for the device to the objective lens end of the optical product wherein each of the side members: is rotatably connected to the external section of the main body, and provides a clamping force via one or more spring mechanism(s) to the external body of the optical product. These rotatable attachments would be an extension of compliant material from the main body of the anti-reflective device allowing a restoring force contained within the energy of the deflected material that would clamp the anti-reflective device to an optical product. In this assembly, the compliant material could be of elastomeric, plastic or metallic material.

In a fourth embodiment, the anti-reflective device comprises: an anti-reflective device for optical products wherein the device includes an anti-reflective portion and an attachment means, the anti-reflective device comprising: a cylindrical main body, which includes an anti-reflective member located in the internal section of main body and comprised of thin-walled structures extending in a direction parallel to the optical axis of the optical product, and one or more side members that function as the attachment means for the device to the objective lens end of the optical product wherein each of the side members: is rotatably connected to the external section of the main body, and provides a clamping force via one or more spring mechanism(s) to the external body of the optical product. In this assembly, the springs used would be compression springs. These springs would produce a restoring force, rotating the attachment pieces to a closed position when not in use. When the user squeezed the attachment pieces, the springs would compress, creating a restoring force desirable to attach the anti-reflective device to an optical product.

In a final embodiment, the anti-reflective device comprises: an anti-reflective device for optical products wherein the device includes an anti-reflective portion and an attachment means, the anti-reflective device comprising: a cylindrical main body, which includes an anti-reflective member located in the internal section of main body and comprised of thin-walled structures extending in a direction parallel to the optical axis of the optical product, and one or more side members that function as the attachment means for the device to the objective lens end of the optical product wherein each of the side members: is rotatably connected to the external section of the main body, and provides a clamping force via one or more spring mechanism(s) to the external body of the optical product. In this embodiment, there are no contours to make for an ergonomic design, the design lacks both an elastomeric material which allows for a tighter fit to the optical product, and ledges which allow for the correct seating of the device on an optical product. This design is a basic model for how an embodiment can be based, lacking design elements and improvements that were utilized to give a tighter fit and allow for ease of use.

A preferred method of using an anti-reflective device comprises: an anti-reflective device for optical products wherein the device includes an anti-reflective portion and an attachment means, the anti-reflective device comprising: a cylindrical main body, which includes an anti-reflective member located in the internal section of main body and comprised of thin-walled structures extending in a direction parallel to the optical axis of the optical product, and one or more side members that function as the attachment means for the device to the objective lens end of the optical product wherein each of the side members: is rotatably connected to the external section of the main body, and provides a clamping force via one or more spring mechanism(s) to the external body of the optical product, wherein the method comprises the steps of: grasping the anti-reflective device in a first hand, squeezing either side of the attachment members with thumb and forefinger so as to open the clamping mechanism for the attachment, placing the anti-reflective device over the objective end of an optical product in the seated position determined by the design of the product and releasing either side of the attachment members.

The method of the above preferred embodiment also insures that by releasing either side of the attachment method, one secures the fit of the anti-reflective device onto an optical product.

BRIEF DESCRIPTION OF THE DRAWINGS

The above set forth and other features of the invention are made more apparent in the ensuing Description of the Preferred Embodiment when read in conjunction with the attached drawings, wherein.

DESCRIPTION OF THE PREFERRED EMBODIMENTS

Figure 1:
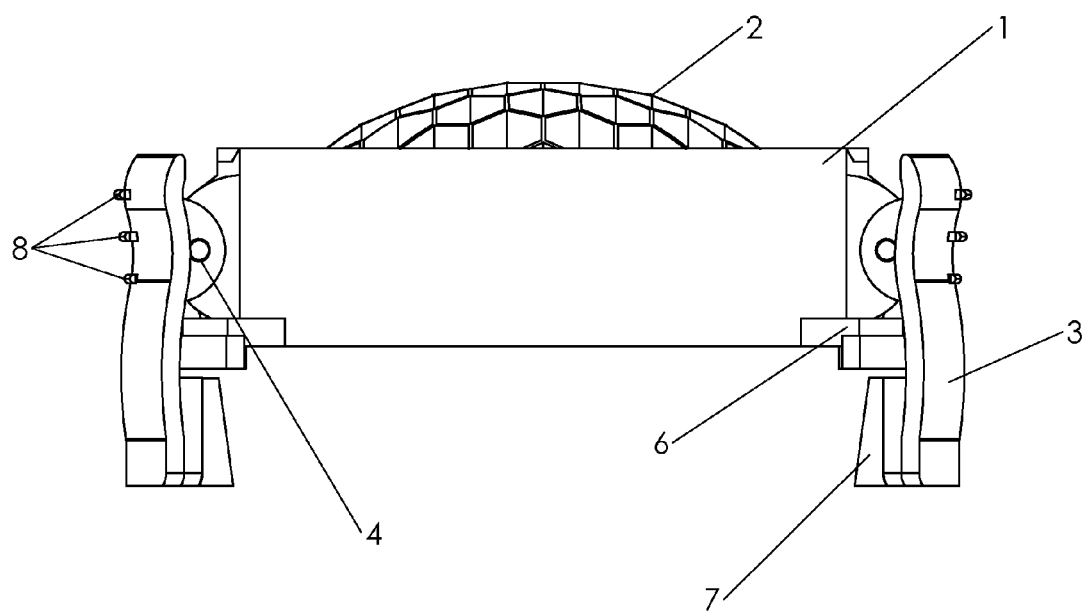
FIG. 1 is a perspective view of the preferred embodiment of the anti-reflective device for optical products showing the side attachments and main body of the invention.

The invention shows an anti-reflective device in FIG. 1 where the main cylindrical body 1 surrounds thin walled protrusions extending parallel to the optical axis of an optical device 2. Rotatably attached 4 to the main body 1 are the attachment means 3 which allow for the connection of the device to an optical product. Also related in FIG. 1 are structures 6 allowing the placement of the device on an optical product in such a way that ensures that the thin walled protrusions extend parallel to the optical axis of the optical product. Once the device has been placed on an optical product, the elastomeric material 7 that may comprise a portion or all of the attachment members will aid in ensuring a secure fit of the device on an optical product. In order to ease the gripping and placement of the device onto an optical product, protrusions 8 may be added to the attachment members 3 to allow for a more secure and/or more ergonomic grip of the device.

Figure 2:
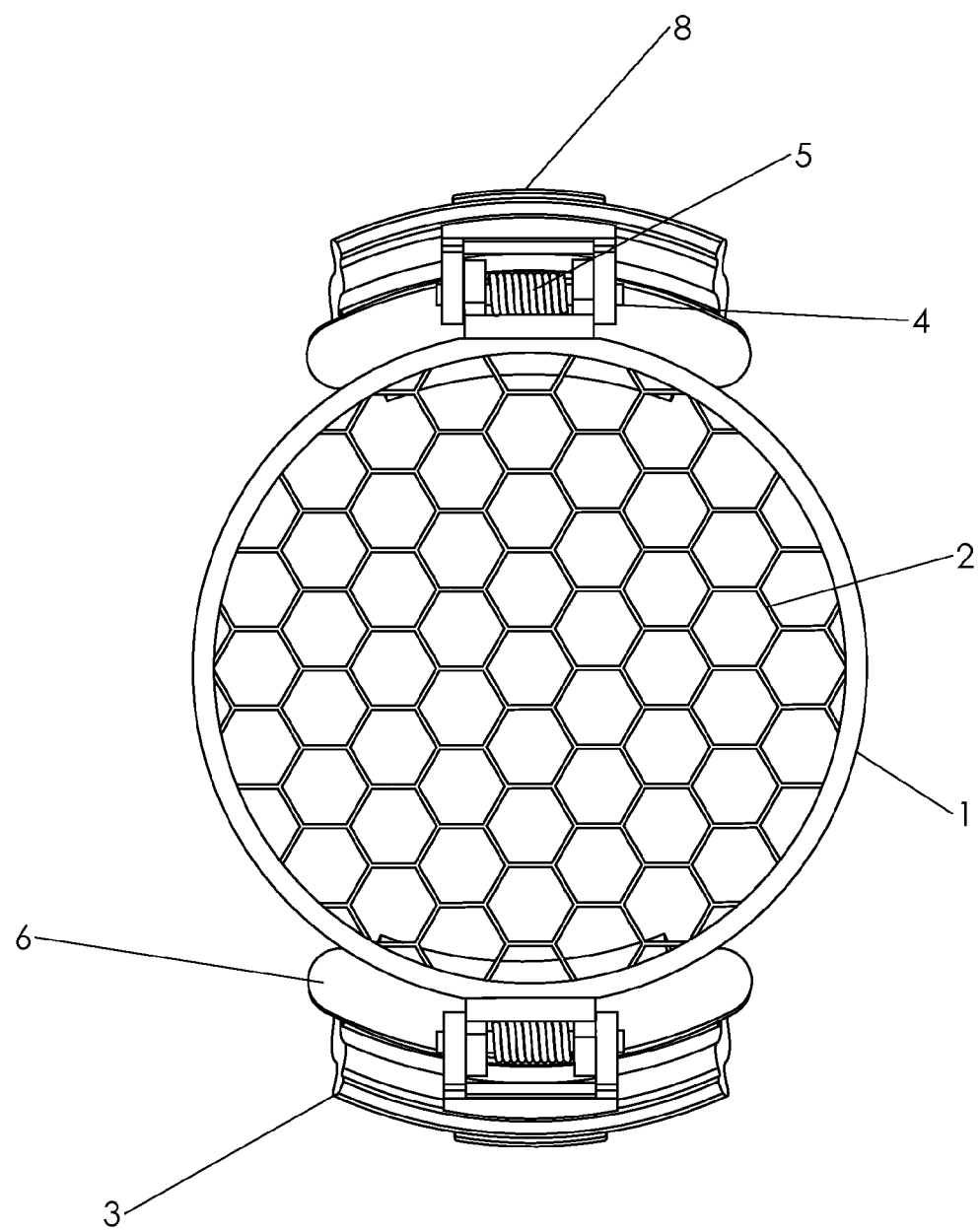
FIG. 2 is a perspective view of the preferred embodiment of the anti-reflective device for optical products showing the structures used to secure the device in the correct place on the objective lens.

In FIG. 2 the same device is shown from the top, displaying the cylindrical main body 1 with thin walled protrusions 2 for anti-reflective purposes and attachment members 3 hingedly attached 4 to the main body. In this figure, the spring mechanism 5 responsible for ensuring secure grip of the device is depicted. In this, the preferred embodiment, the spring mechanism utilized is a torsion spring.

Figure 3:
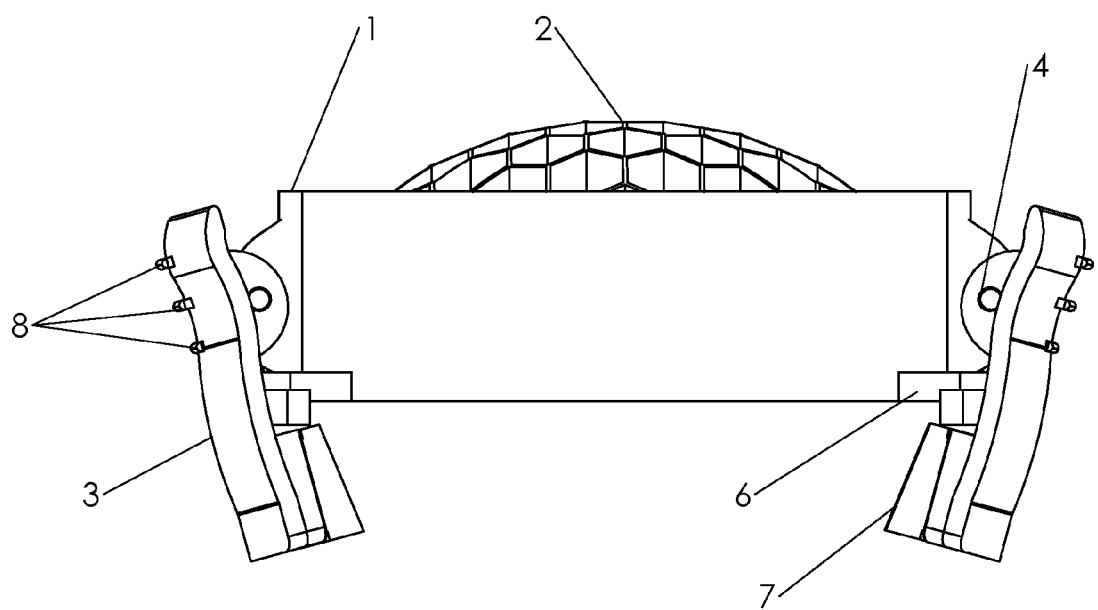
FIG. 3 is a perspective view of the preferred embodiment of the anti-reflective device for optical products showing the attachment members of the product closed as they would grip the body of an optical product.

The anti-reflective device shown in FIG. 3 is the preferred embodiment where the side members of the device 3 are in a closed state, allowing for the secure grip of the main body 1 and thin walled protrusions 2 to an optical product. In this figure, the elastomeric material 7 would aid in gripping the external body of the optical product.

Figure 4:
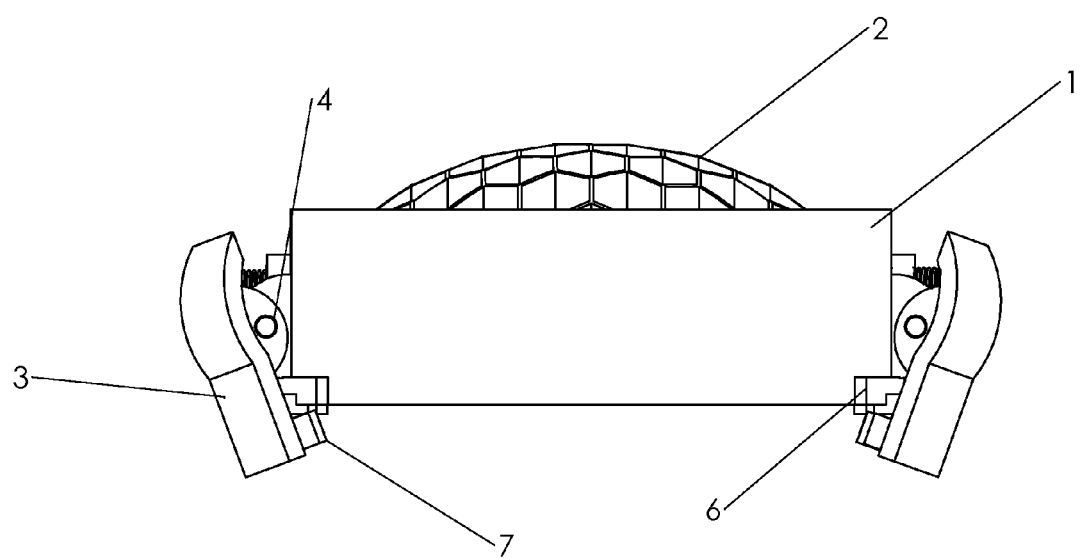
FIG. 4 is a perspective view of another embodiment of the device from the side with closed attachment members as they would grip the body of an optical product.
Figure 5:
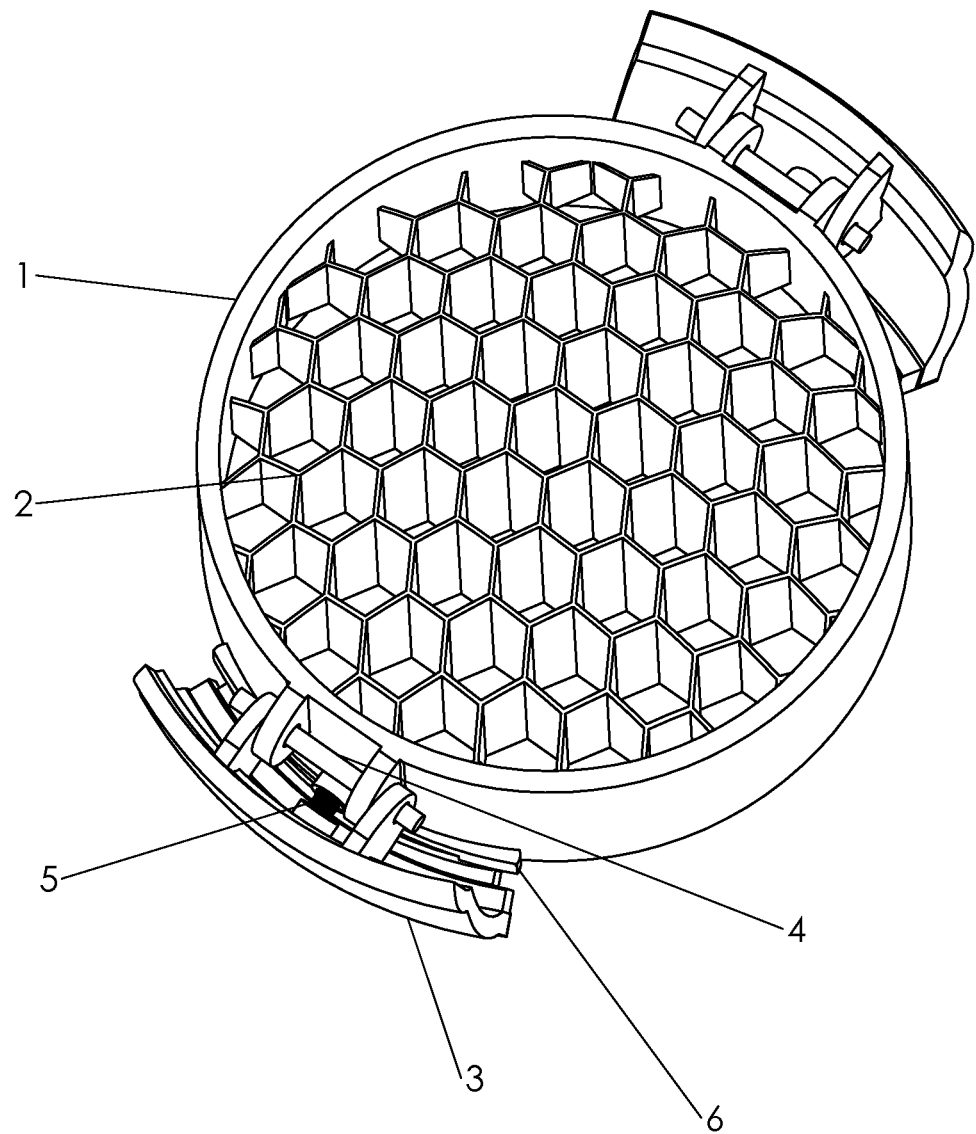
FIG. 5 is a perspective view of a second embodiment of the device from the bottom of the device showing the various parts of the device.

FIG. 4 depicts a perspective view of another embodiment of the same anti-reflective device. This embodiment of the device has similar features to the preferred embodiment in the main cylindrical body 1 with thin walled protrusions 2 and attachment members 3. This device has attachment members 3 extending into the diameter of the main body 1 and 2 to allow the attachment members 3 to grip an optical product with an optical lens diameter that is smaller than the external diameter of the main body 1 and 2. Such an assembly would prevent the damaging of the objective lens of the optical product upon placement and removal of the anti-reflective device from said optical product. FIG. 5 depicts an isometric view of an embodiment of the device using a tension spring 5 to create a torque about the hinged attachment 4. In this embodiment of the device, the spring 5 used to secure the attachment members 3 to the body of an optical product is a tension spring rather than a torsion spring. This setup may allow a tighter grip around the body of the optical product, but would make rotating the attachment about the hinge 4 more difficult.

Figure 6:
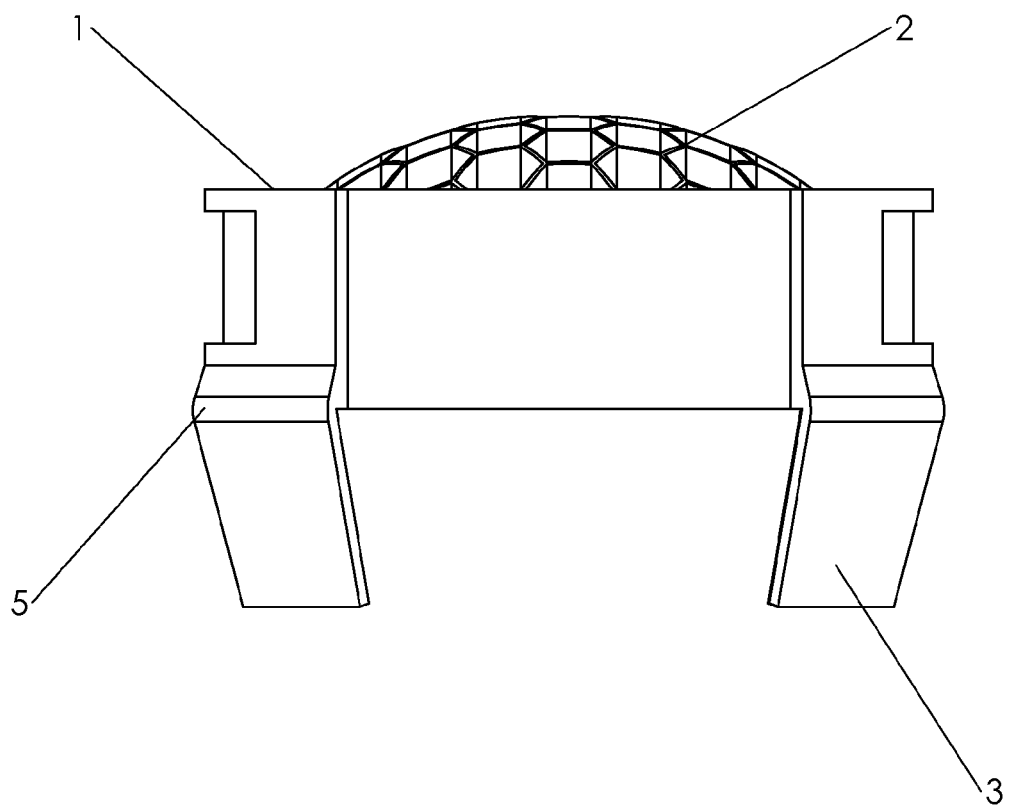
FIG. 6 is a perspective view of a third embodiment of the device showing the side of the device and the attachment members in a closed position.
Figure 7:
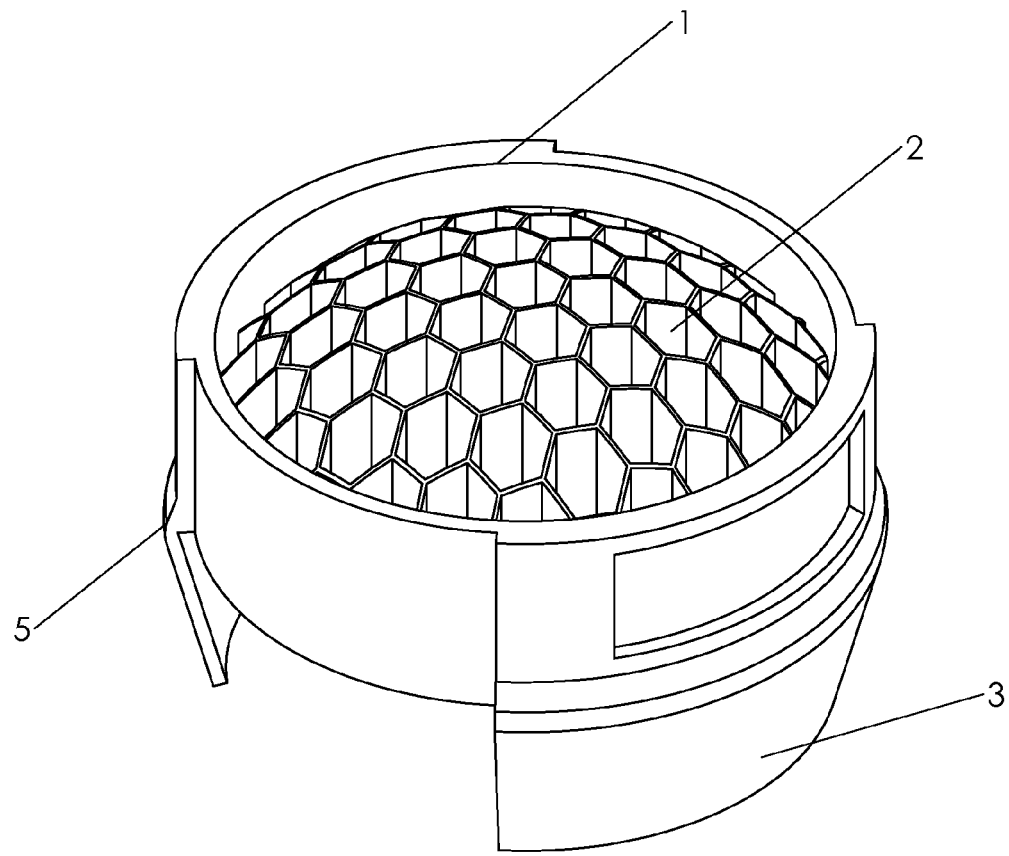
FIG. 7 is an isometric view of the third embodiment of the device showing the device and the cylindrical housing with the anti-reflective structures.

FIG. 6 depicts a third embodiment of the anti-reflective device. In this embodiment, the attachment members 3 are still rotatable about the body of anti-reflective device 1 and 2, but now utilize the elastic potential in the material of the device to grip the optical product on which they are to be used. In this embodiment, the spring mechanism 5 is the material itself. FIG. 7 shows an isometric view of the same embodiment of the device. In this figure, the attachment members 3 could be molded with the main body 1 and 2 or may be attached to the main body after the body has been molded.

Figure 8:
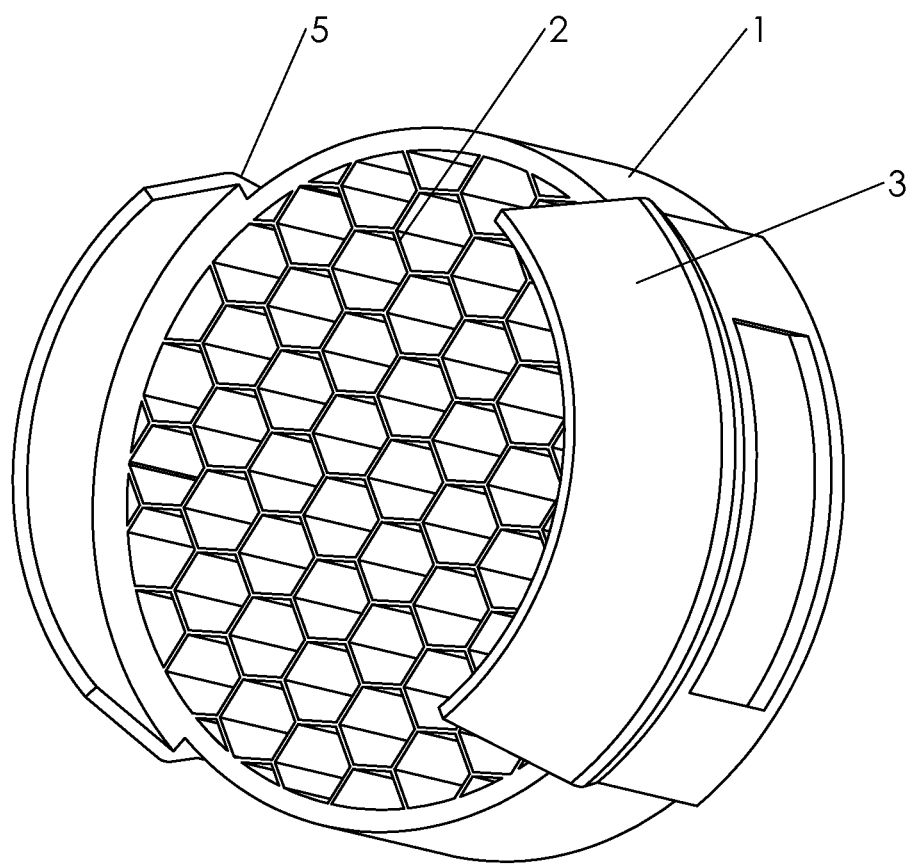
FIG. 8 is an isometric view of the third embodiment showing the underside of the device.

FIG. 8 shows the under side of an embodiment of the device where ledges 6 which may be added to the product or created by the transition from the main body 1 and 2 to the attachment members 3 may be used to seat the device on the body of an optical product parallel to the optical axis of the objective lens of the aforementioned optical product.

Figure 9:
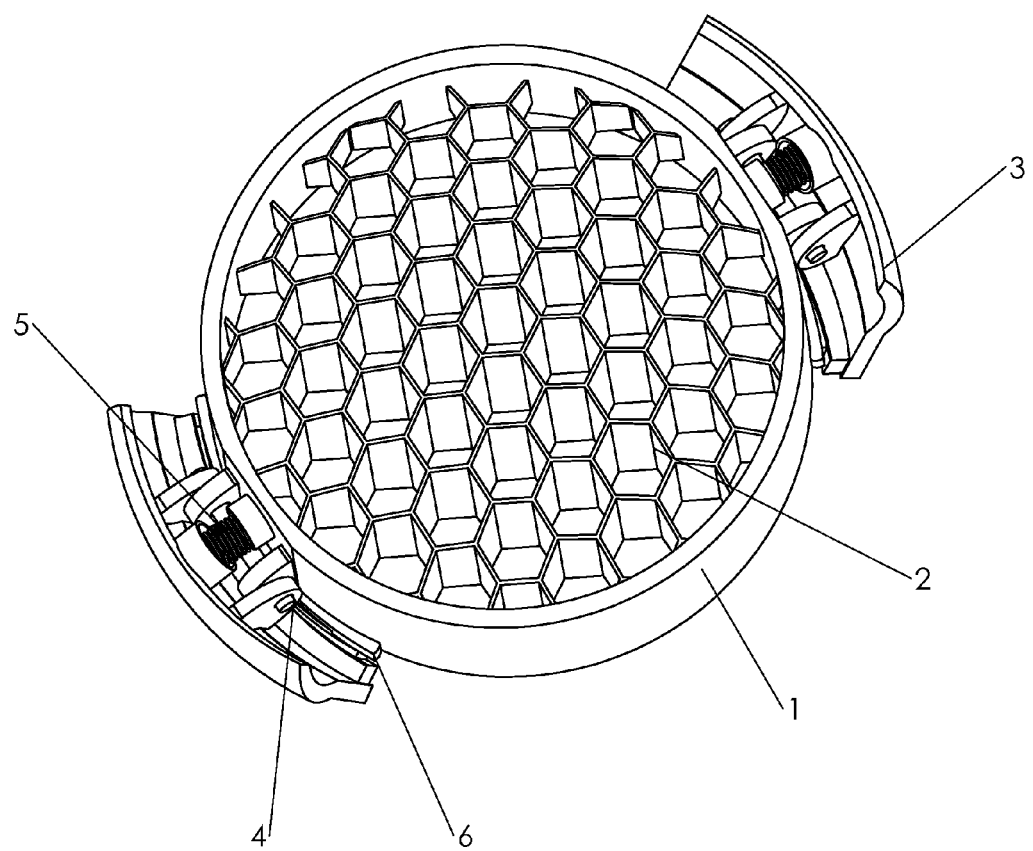
FIG. 9 is an isometric view of a fourth embodiment showing the embodiment and spring mechanism used to achieve a fit of the device onto an optical product.

FIG. 9 depicts another embodiment option for the device where the same type of cylindrical main body with thin walled protrusions 1 and 2 is used to prevent reflections of incident rays on an optical device. In this embodiment, the attachment members 3 are again rotatably 4 attached to the main body, but the spring mechanism used 5 is a compression spring rather than a tension or torsion spring. Thus, when the attachment members 3 are compressed, the spring compresses, and when they are released, the spring extends, rotating the attachment members 3 and promoting contact between the external body of the optical device and the elastomeric material 7 that may make up part of the attachment members. In this figure, the compression springs 5 can be seen to make contact with both the attachment members 3 and the main body of the anti-reflective device 1 and 2. This contact closes the attachment members once they have been released and allows connection of the anti-reflective device to the external body of an optical product.

Figure 10:
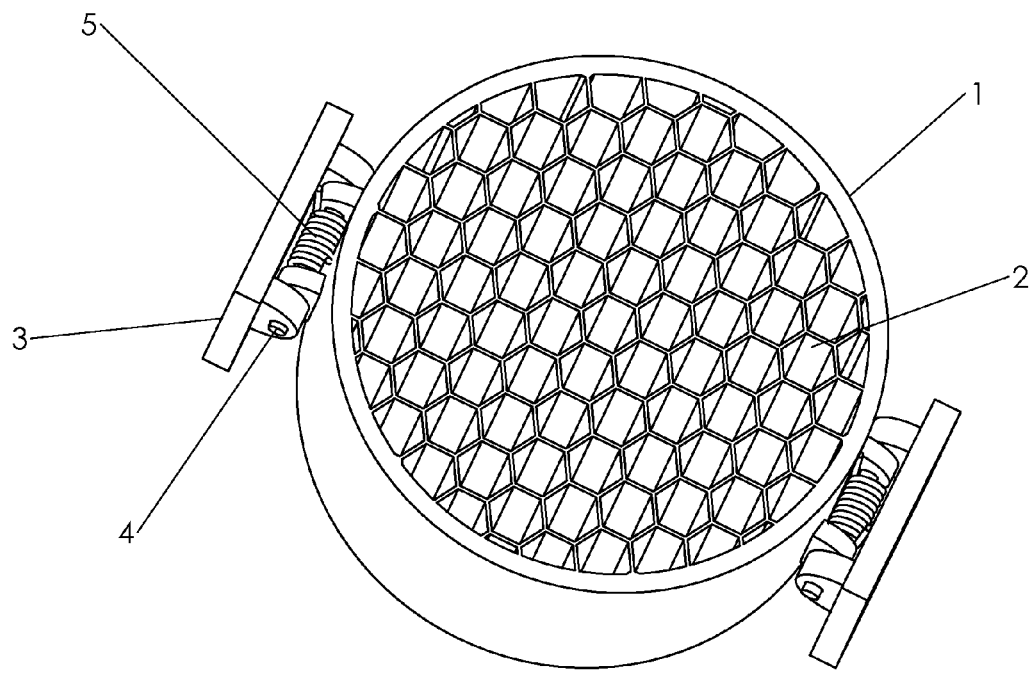
FIG. 10 is a perspective view of a basic design of an antireflective device showing the top of said device.

FIG. 10 depicts a very basic design for an anti-reflective device and attachment members. In this depiction, the top of the device is seen, and the main cylindrical body and thin-walled protrusions 1 and 2 can be seen. The attachment members 3 and rotatable attachments 4 can be seen, along with the spring mechanism allowing for a tight fit 5. In this embodiment, the device is lacking ledges to allow for the correct seating of the device 6, an elastomeric material 7 promoting highly frictional contact between the device and the external body of an optical product 9, and protrusions allowing for better grip of the product 8. This depiction is a very basic version of the anti-reflective device, and can be built up into many designs of the same device.

Figure 11:
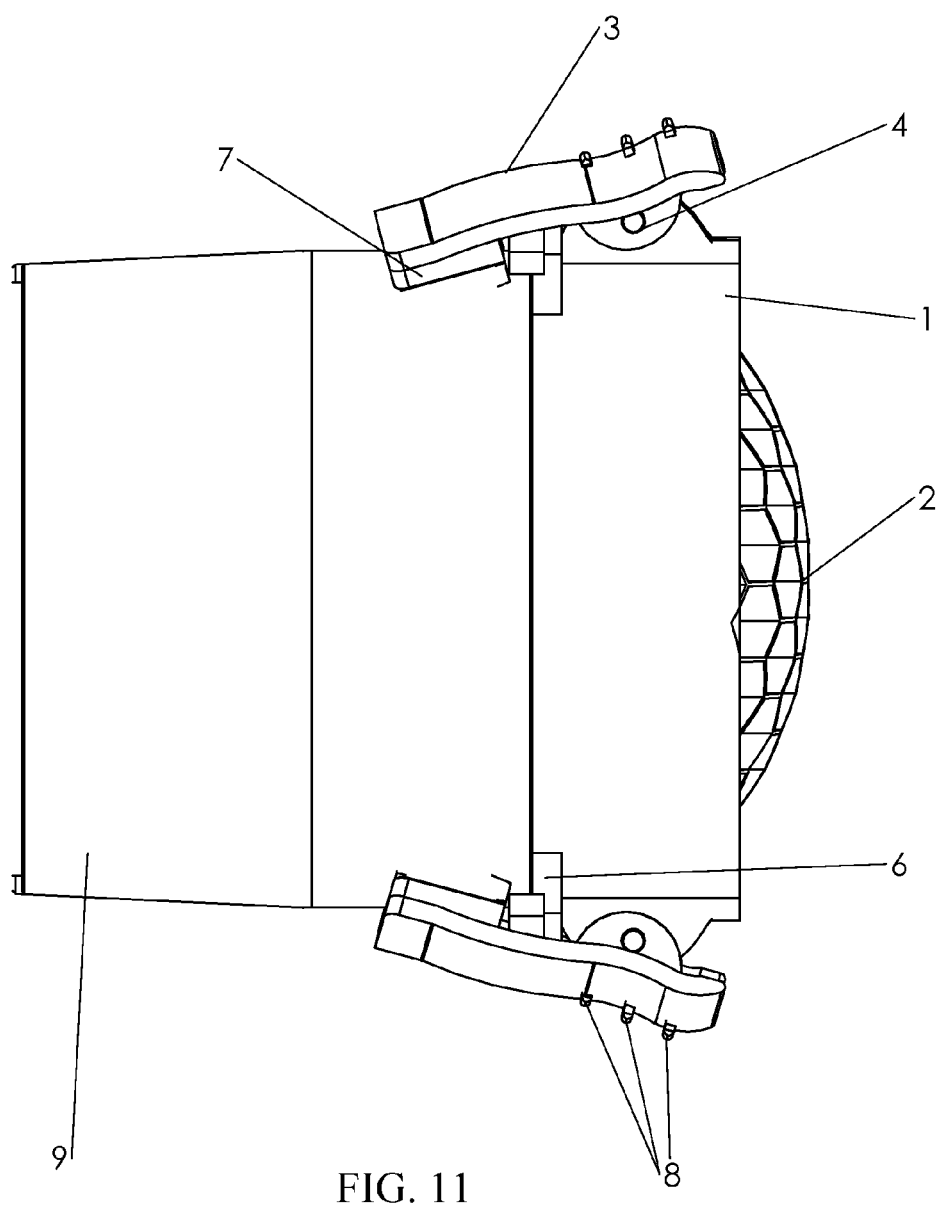
FIG. 11 is a perspective view that shows the anti-reflective device attached to the objective lens end of an optical product.
Figure 12:
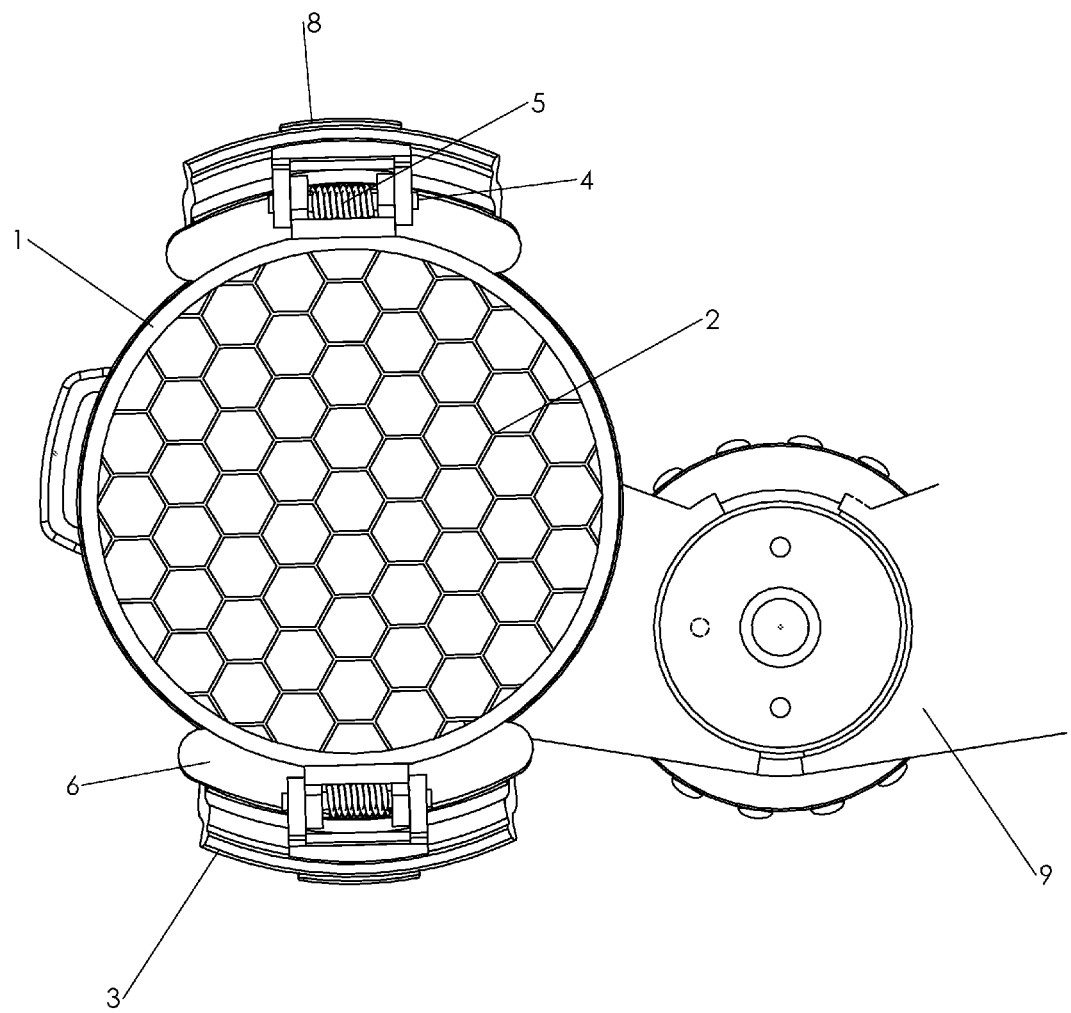
FIG. 12 shows a perspective view of the top of the anti-reflective device as it is attached to the objective lens end of an optical product.

FIG. 11 shows the preferred embodiment of the anti-reflective device as it is clamped to the objective end of an optical product. The attachment members 3 promote the tight fit of the device to the optical product being used. FIG. 12 depicts the same device on an optical product 9, and demonstrates how the thin-walled protrusions 2 extend along an axis parallel to the optical axis of the optical product. In this depiction, it can be seen that the thin walled protrusions 2 extend along a direction parallel to the optical axis of an optical product and would thus promote light transmission into the optical product while preventing the reflection of incident rays along the direction of the objective lens while transmitting the necessary light transmission allowing use of the product.

The invention claimed is:

1. An anti-reflective device for an optical product having an external body, at least one optical axis, and at least one objective lens, wherein the device includes an anti-reflective portion and an attachment means, the anti-reflective device comprising:
   a cylindrical main body having an internal section, an external section, and a center, which includes an anti-reflective member located in the internal section of the main body that is comprised of a plurality of thin-walled structures extending in a direction parallel to the first optical axis of the optical product,
   at least one or more side members that function as the attachment means for the device to the external body of the optical product wherein each of the side members:
   a. is rotatably connected to the external section of the cylindrical main body
   b. is coupled to the external section of the cylindrical main body and provides a clamping force to the external body of the optical product to assist in releasably attaching the anti-reflective device to the optical product.

2. The device of claim 1, wherein the clamping force is generated by a spring mechanism having a specification and a geometry.

3. The device of claim 2, wherein the geometry and specification of the spring mechanism are determined so as to achieve a universal brand fit for one or more specific objective lens diameter(s) of the optical product.

4. The device of claim 1, where at least one of the side members is shaped such that it contours to the external body of a multitude of optical products.

5. The device of claim 1, where at least one of the thin-walled structures are longer towards the center of the cylindrical main body, and at least one of the thin-walled structures are shorter farther away from the center of the cylindrical main body.

6. The anti-reflective device of claim 1, where the device does not require pre-existing mating pieces on the external body of the optical product.

7. The anti-reflective device of claim 1, where the cylindrical main body of the anti-reflective device has additional structures allowing placement of the anti-reflective device along an axis parallel to the optical axis of the optical product.

8. The anti-reflective device of claim 6, where the cylindrical main body additionally comprises of one or more ledges, which when contacted with the external body of the optical product, produce a seated alignment of the anti-reflective device against the external body of the optical product in a direction parallel to the optical axis of said optical product.

9. The anti-reflective device of claim 1, wherein the side members in a closed state provide a radial clamping force on the external body of the optical product, and in an open state, allow for quick release of the anti-reflective device from the external body of the optical product.

10. The anti-reflective device of claim 1, where the side members are at least partially comprised of an elastomeric material that provides additional frictional engagement with the external body of the optical product, thus preventing slippage of the anti-reflective device.

11. The anti-reflective device of claim 1, wherein the anti-reflective portion is comprised principally of hexagonal protrusions in a repeating pattern.

12. The anti-reflective device of claim 2, wherein the spring mechanism is a torsional spring mechanism.

13. The anti-reflective device of claim 1, where there are two side members on primarily opposite sides of the cylindrical main body.

14. The anti-reflective device of claim 1, where the side members have protrusions allowing for an ergonomic or more secure grip of the anti-reflective device.

15. A method of using an anti-reflective device for an optical product having an external body, at least one an optical axis, and at least one objective lens, wherein the device includes an anti-reflective portion and an attachment means and comprises a cylindrical main body having an internal section, an external section and a center, which includes an anti-reflective member located in the internal section of the main body and comprised of a plurality of thin-walled structures extending in a direction parallel to the first optical axis of the optical product, with one or more side members that function as the attachment means for the device to the external body of the optical product wherein each of the side members:
   a. is rotatably connected to the external section of the cylindrical main body
   b. provides a clamping force via one or more spring mechanism(s) to the external body of the optical product wherein the method comprises the steps of:
   grasping the anti-reflective device in a first hand
   squeezing at least one side of at least one side member with thumb and forefinger so as to open the attachment means
   placing the anti-reflective device over the external body of an optical product in in order to produce a seated alignment with the external body of the optical product, and
   releasing at least one side of the side members.

16. The method as related in claim 15 whereby releasing at least one side of at least one side member secures the anti-reflective device onto the optical product.

* * * * *